United States Patent [19]

Tsunoda et al.

[11] Patent Number: 4,513,926
[45] Date of Patent: Apr. 30, 1985

[54] BAIL ARM CONTROL DEVICE FOR A SPINNING REEL

[75] Inventors: Kikuo Tsunoda; Takehiro Kobayashi, both of Hiroshima, Japan

[73] Assignee: Ryobi Ltd., Hiroshima, Japan

[21] Appl. No.: 374,657

[22] Filed: May 4, 1982

[30] Foreign Application Priority Data

May 5, 1981 [JP] Japan .................................. 56-68030
May 5, 1981 [JP] Japan .................................. 56-68031

[51] Int. Cl.$^3$ ............................................ A01K 89/01
[52] U.S. Cl. .............................................. 242/84.2 G
[58] Field of Search ...................... 242/84.2 G, 84.21 R

[56] References Cited

U.S. PATENT DOCUMENTS 4,162,048  7/1979  Sazaki ........................... 242/84.2 G
4,279,387  7/1981  Morimoto ...................... 242/84.2 G Primary Examiner—Billy S. Taylor
Attorney, Agent, or Firm—Sughrue, Mion, Zinn, Macpeak, and Seas

[57] ABSTRACT

A bail arm control device for a spinning reel includes a mechanism controlling a stopping position of the bail in the winding position operating against the force of a dead point spring. The mechanism is manually adjustable by the user and may include a rotatable cam, a sliding member or the like.

9 Claims, 10 Drawing Figures

BAIL ARM CONTROL DEVICE FOR A SPINNING REEL

BACKGROUND OF THE INVENTION

1. Field of the Invention

This invention relates to a bail arm control device for a spinning reel.

2. Description of the Prior Art

FIG. 1 shows a known spinning reel. If the handle 2 is turned, a rotor 3 supported rotatably on a main body 1 is rotated to reciprocate a spool 4 to an fro. A fishing line is guided by a hook 5a on a bail arm 5, and wound on the spool 4. If the bail arm 5 is turned laterally of the rotor 3, the fishing line ceases to be guided, and is released from the spool 4. The bail arm 5 is secured at one end to a bail arm lever 6. A pair of support housings 7 are provided on the diametrically opposite sides of the rotor 3. The bail arm lever 6 is pivotably supported on the support housings 7 by pivot shafts 8, such as stepped screws, so that it may be rotatable beyond the dead points of a torsion spring 9 between a winding position in which the fishing line is rewound as shown in FIG. 1, and a casting position in which the bail arm lever 6 is turned laterally of the rotor 3 for releasing the fishing line. A stop boss 10 projecting from the rear face of the bail arm lever 6 and a stop boss 11 on each support housing 7 abut one another to hold the bail arm 5 in its winding position as shown in FIG. 1.

The resilience of the torsion spring 9, however, causes the stop bosses 10 and 11 to strike each other violently whenever the bail arm 5 is rotated between its winding and casting positions. The bosses 10 and 11, and the pivotal joints are thus worn by friction and mechanical shock. The wear brings about a deviation from the predetermined standing position of the lever 6, resulting in a failure of the fishing line to be wound properly, or the likelihood of the fishing ling becoming twisted.

SUMMARY OF THE INVENTION

In view of the foregoing problems, it is an object of this invention to provide a bail arm control device which can vary the stop position of the bail arm to enable optimum winding of the fishing line even if local wear has developed.

Thus, this invention provides a bail arm control device for a spinning reel, including a bail arm lever carrying one end of a bail arm, and rotatably supported on support housings of a rotor between its winding and casting positions beyond the dead point of a torsion spring, characterized by a stop cam supported pivotably on the support housing for rotation by a mechanism attached to the support housing, the stop cam when displaced by rotation cooperating with a stop boss on the rear face of the bail arm lever to control the winding position of the bail arm.

DETAILED DESCRIPTION OF THE PREFERRED EMBODIMENTS

Figure 1:
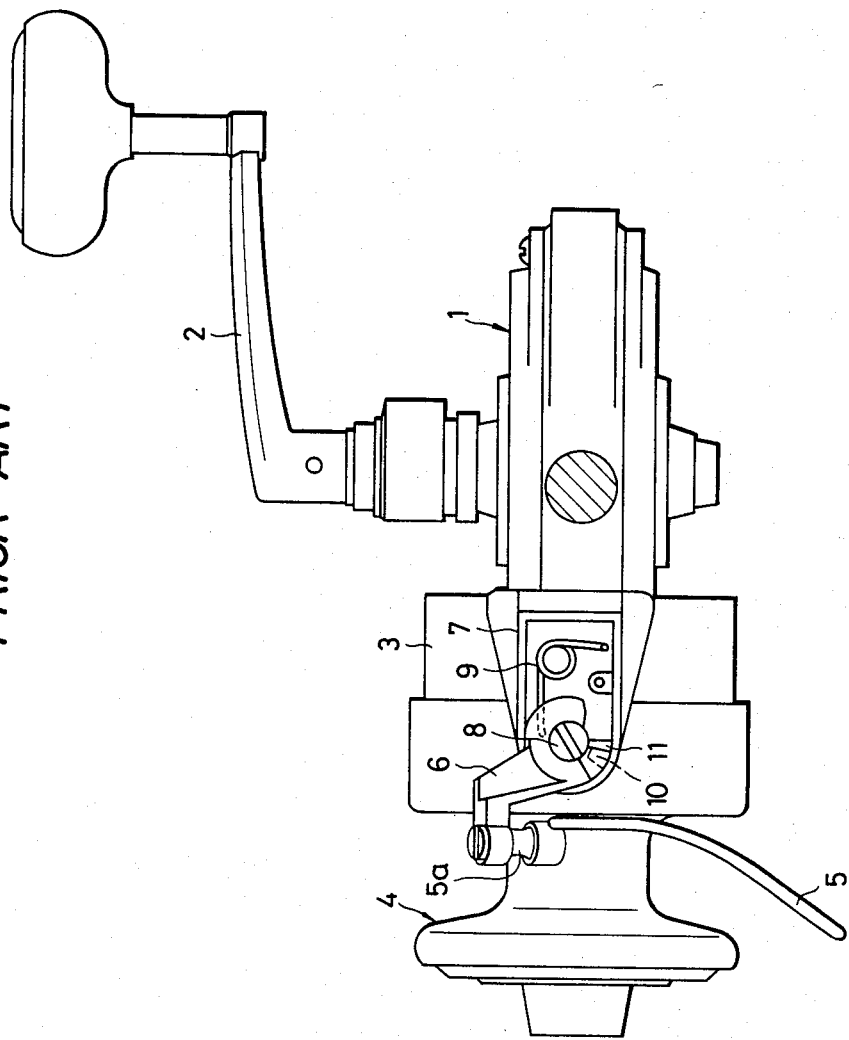
FIG. 1 is a top plan view of a spinning reel having a known bail arm stop mechanism.
Figure 2A:
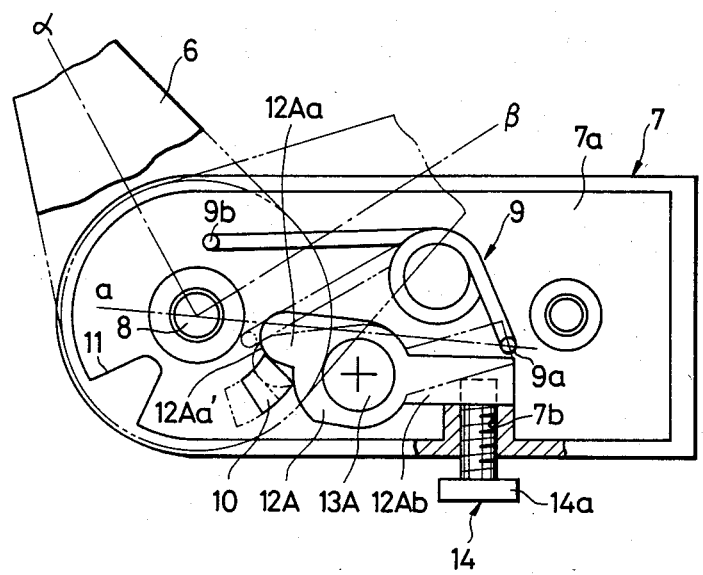
FIG. 2A is a top plan view of a bail arm control device for a spinning reel according to a first embodiment of this invention.
Figure 2B:
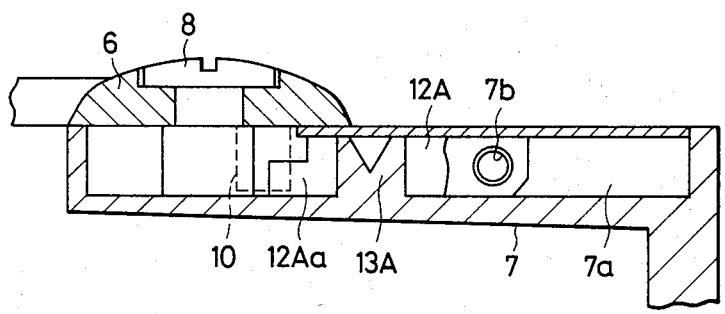
FIG. 2B is a longitudinal sectional view of the device shown in FIG. 2A.

The invention will now be described in detail, with reference to the accompanying drawings in which like parts, including those of the prior art device, are designated by like numerals.

As shown in FIGS. 1 to 3B, support housings 7 are provided on the diametrically opposite sides of a rotor 3, and a bail arm 5 is rotatably supported at one end by a bail arm lever 6 pivotably supported on a pivot shaft 8, such as a stepped screw. A torsion spring 9 is provided in a concavity 7a and fastened to the support housing 7 at one end 9a, while the other end 9b of the torsion spring 9 is fastened to the bail arm lever 6. The bail arm lever 6 is urged by the torsion spring 9 for rotation between its winding position as shown by a solid line in FIG. 2A, in which a fishing line is wound, and its lying position as shown by a broken line, in which the fishing line is released, beyond the dead point a of the torsion spring 9.

The bail arm lever 6 is provided with a stop boss 10 on its rear face, and the support housing 7 is provided with a stop boss 11. If the stop boss 10 is locked with the stop boss 11 by overcoming the force of the torsion spring 9, the bail arm 5 is held in its casting position β. The support housing 7 is provided with an adjustable stop member in the form of a stop cam 12A supported pivotably by a boss 13A. If the stop boss 10 abuts on the stop cam 12A directly or indirectly by overcoming the force of the torsion spring 9, the bail arm 5 is held in its winding position α. The support housing 7 is also provided with a mechanism 14 for rotating the stop cam 12A as required to enable it to cooperate with the stop boss 10 to vary the winding position α of the bail arm lever 6.

The stop cam 12A includes a projection 12Aa at one end, and its peripheral surface defines a cam surface 12Aa' abutting on the stop boss 10. The other end of the stop cam 12A defines a control leg 12Ab which is actuated by a mechanism 14 to rotate the stop cam 12A.

The supporting housing 7 has a threaded hole 7b. The mechanism 14 for rotating the stop cam 12A comprises an adjusting screw 14a received rotatably in the threaded hole 7b, and having an inner end engaged with the control leg 12Ab.

Figure 3A:
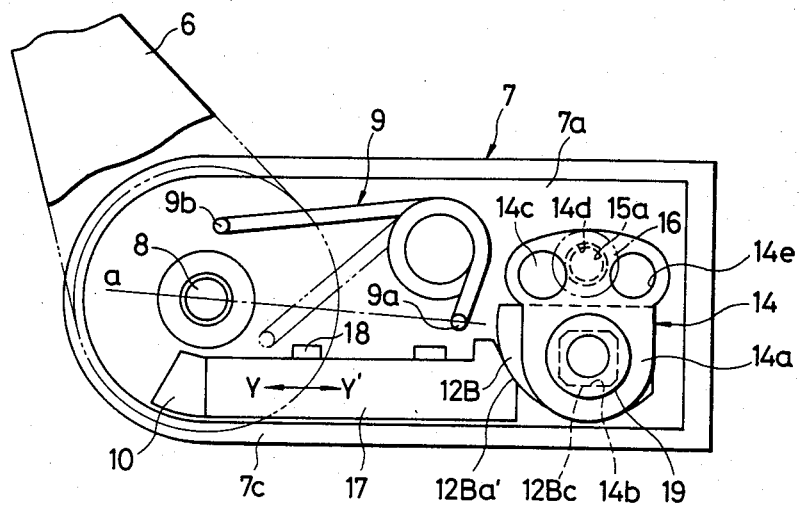
FIG. 3A is a top plan view of a second embodiment of this invention.
Figure 3B:
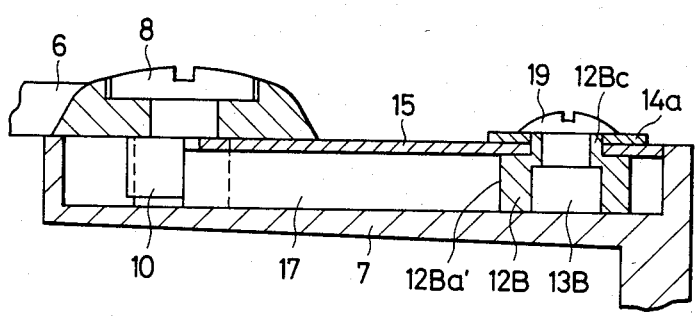
FIG. 3B is a longitudinal sectional view of the device shown in FIG. 3A.
Figure 4A:
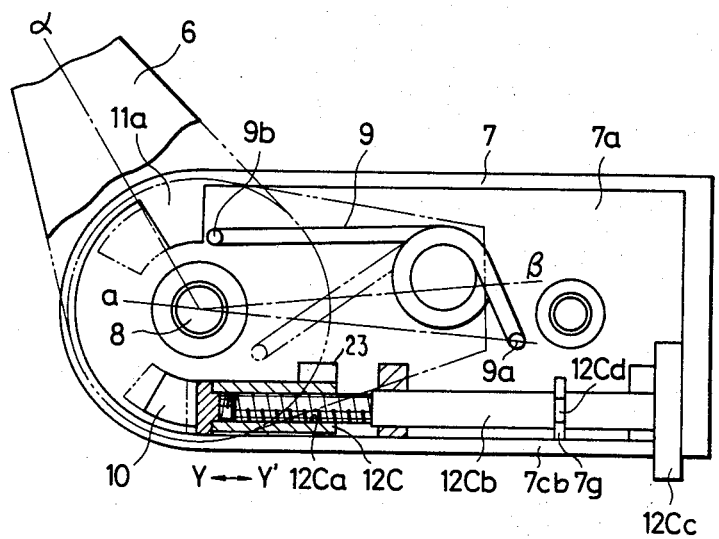
FIG. 4A is a top plan view of a third embodiment of this invention.
Figure 4B:
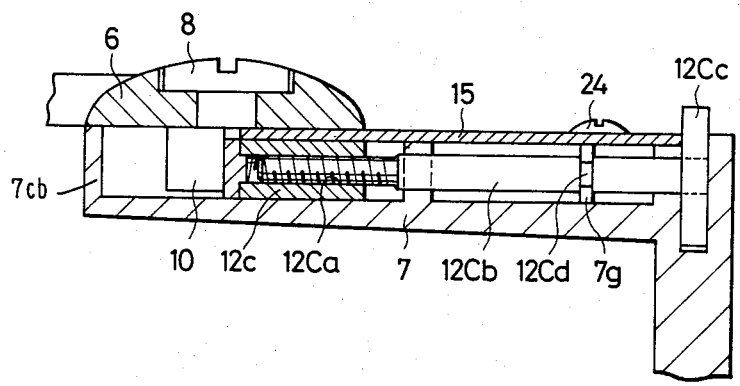
FIG. 4B is a longitudinal section view of the device shown in FIG. 4A.

Referring to FIGS. 3A and 3B, a second embodiment of this invention comprises a stop member adjusting cam 12B having an outer periphery which defines a cam surface 12Ba' having a gradually varying distance from the center of a boss 13B, and a polygonal shaft portion 12Bc which is coaxial with the boss 13B. The stop member adjusting cam 12B is rotatably fastened to the boss 13B by a screw 19. The mechanism 14 for rotating the stop cam 12B comprises a control plate 14a formed adjacent to one end thereof with a polygonal hole 14b in which the polygonal shaft portion 12Bc of the stop member adjusting cam 12B is received. Adjacent to the other end thereof, the control plate 14a is provided with a plurality of control holes 14c, 14d and 14e each having a center on the circumference of an imaginary circle concentric with the boss 13B. The support housing 7 has a cover 15 provided with a threaded hole 15a which is alignable with any of the control holes 14c to 14e. A screw 16 is inserted through the threaded hole 15a and one of the control holes 14c to 14e aligned therewith, whereby the stop member adjusting cam 12B can be fixed in an appropriately rotated position depending on the control hole aligned with the threaded hole 15a.

A stop member 17 is slidably disposed in the concavity 7a of the support housing 7, and has one end engaged with a stop member adjusting boss 10, while the other end of the stop shaft 17 is engaged with the cam surface 12Ba' of the stop cam 12B. The stop member 17 is slidable in either direction as shown by arrows Y and Y' upon rotation of the stop cam 12B, whereby the winding position α of the bail arm lever 6 is altered.

The stop member 17 is held between the side wall 7c of the support housing 7 and projections 18 provided on the bottom wall of the concavity 7a, so that is may not move transversely, but may only slide longitudinally in the direction of the arrow Y or Y'.

If the screw 16 is removed, and the control plate 14a is rotated, the stop member adjusting cam 12B is rotated, and its cam surface 12Ba' causes the stop member 17 to slide. If another control hole is aligned with the threaded hole 15a, and the screw 16 is inserted therethrough, the position of the stop boss 10 can be varied to alter the winding position α of the bail arm 5 as desired.

A third embodiment of this invention comprises a slidable stop member 12D disposed between the side wall 7cb of a support housing 7 and a projection 23 provided on the bottom wall of the housing 7. The stop member 12D has one end engaged with a stop boss 10, and an axial threaded bore 12Ca in which an adjust screw 12Cb is received. The adjust screw 12Cb is rotatably secured to the support housing 7, and has knob 12Cc projecting outwardly from the support housing 7. If the adjust screw 12Cb is rotated in either direction, the stop member 12D is slidingly moved in the direction of arrows Y or Y', whereby the position of the stop boss 10 is varied to alter the winding position α of the bail arm 5. The adjust screw 12Cb has an annular groove 12Cd in which projections 7g from the support housing 7 are engaged to prevent axial movement of the adjust screw 12Cb, while permitting its rotation.

Figure 5A:
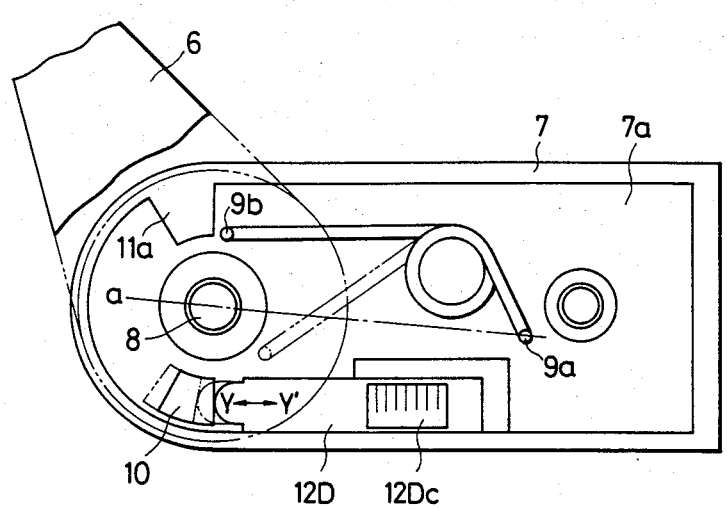
FIG. 5A is a top plan view of a fourth embodiment of this invention.
Figure 5B:
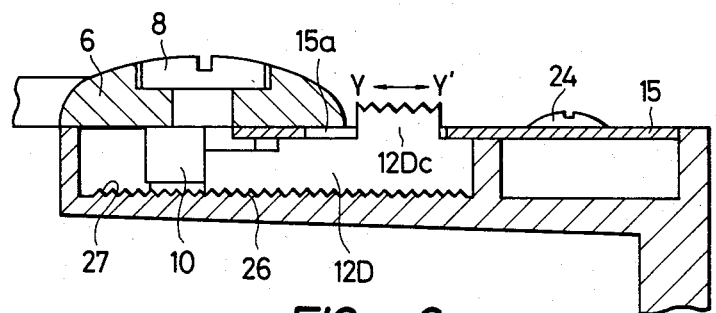
FIG. 5B is a longitudinal sectional view of the device shown in FIG. 5A.

Referring to FIGS. 5A and 5b, a fourth embodiment of this invention comprises a slidable stop member 12D disposed in the concavity 7a of the support housing 7, and having one end engaged with a stop boss 10. A cover 15 is secured to the housing 7 by a screw 24, and has an opening 15a through which a knob 12Dc projects from the stop member 12D. The stop lever 12D has a bottom surface formed with corrugations 26, and the inner surface of the bottom wall of the housing 7 is likewise formed with corrugations 27. The corrugations 26 and 27 are engaged with each other to prevent any inadvertent sliding movement of the stop member 12D.

Figure 6:
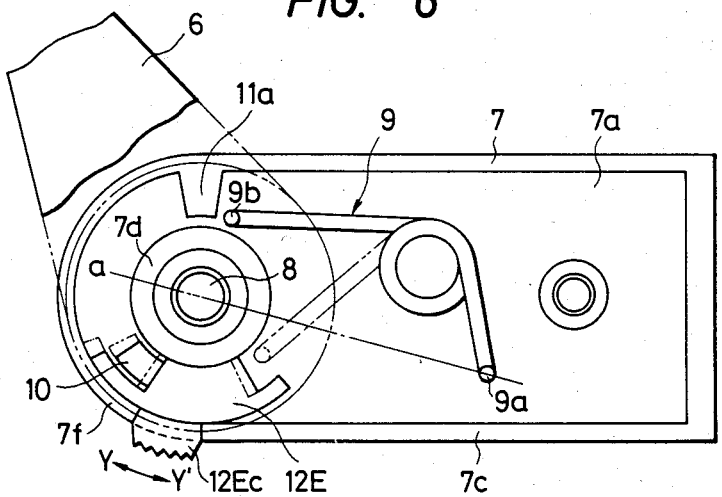
FIG. 6 is a top plan view of a fifth embodiment of this invention.

A fifth embodiment of this invention is shown in FIG. 6, and comprises an arcuate stop member 12E having a radially outwardly projecting knob 12Ec. The stop member 12E is rotatably disposed between a boss 7d in the support housing 7 on which the bail arm lever 6 is rotatably supported, and the side wall 7c of the housing 7. The side wall 7c of the housing 7 has an opening 7f through which the knob 12Ec projects outwardly. If the knob 12Ec is moved, the stop boss 10 is displaced, and the bail arm member 6 is moved. The stop lever 12E has a bottom surface formed with corrugations engaged with corrugations formed on the inner surface of the bottom wall of the housing 7, though those corrugations are not shown. A cover (not shown) is attached to the housing 7 by a screw to hold the stop lever 12E. These arrangements prevent any inadvertent displacement of the stop member 12E.

In case it is necessary to alter the winding position α of the bail arm 5 in the device according to the fourth or fifth embodiment of this invention, the screw 24 is loosened, the knob 12Ec or 12Ec is lifted to the lift the stop member 12D or 12E to disengage its corrugations 26 from the corrugations 27 on the bottom wall of the housing 7, and the stop member 12D or 12E is moved in the direction of the arrow Y or Y'. The stop boss 10 is displaced, and the position of the bail arm lever 6, and hence the bail arm 5, is altered. Then, the screw 24 is tightened to hold the cover 15 against the stop lever, and bring the corrugations 26 and 27 into engagement with each other.

As is obvious from the foregoing description, the device of this invention makes it possible to easily control the position of the bail arm lever in which the fishing line is wound, even if the bail arm lever, the stop boss, or the like has become worn, so that the fishing line can always be wound optimally. The device enables smooth winding and releasing of the fishing line without causing twisting or breaking. The device of this invention, which essentially comprises a stop cam or lever, and a mechanism for its actuation, is simple in construction, inexpensive to manufacture, and easy to handle.

What is claimed is:

1. In a bail arm control device for a fishing line having a housing, a bail arm, a bail arm lever carrying one end of said bail arm with said lever being pivotally supported on said housing for rotation between a winding position and a casting position, and a torsion spring having a dead point for biasing said lever to said positions which are located on the opposite sides of the dead point of said torsion spring, the improvement comprising a first stop boss provided on said bail arm lever, a second stop boss on said housing adapted to be engaged by said first stop boss when said bail arm lever is pivoted to said casting position and adjustable stop means, means for moveably mounting said stop means in said housing for engagement by said first stop boss when said bail arm lever is pivoted to said winding position whereby the position of said bail arm lever may be adjusted to compensate for wear in said bail arm control device.

2. A device as set forth in claim 1 wherein said stop means is comprised of a stop member pivotally mounted in said housing, a cam surface formed on one end of said stop member adapted to be engaged by said first stop boss, and adjusting means extending through said housing in engagement with said stop member for pivoting said stop member to adjust the point of contact between said first stop boss and said cam surface.

3. A device as set forth in claim 2 wherein said stop member is comprised of a lever pivoted intermediate the ends thereof with said can surface formed on one end of said lever and wherein said adjusting means is comprised of a screw member threaded through said housing into engagement with the other end of said lever.

4. The device as set forth in claim 1 wherein said stop means is comprised of an elongated stop member slidably mounted in said housing with one end thereof adapted to be engaged by said first stop boss and further comprising rotatable cam means engageable with the other end of said elongated stop member for adjusting the position of said stop member.

5. A device as set forth in claim 4 wherein said cam means is comprised of a cam member rotatably mounted within said housing, a shaft connected thereto and extending outwardly of said housing, an operating plate having a plurality of apertures therein secured to the outer end of said shaft, an aperture in said housing and fastening means adapted to extend through a selected one of said apertures in said plate and the aperture in said housing to adjustably locate the position of said cam.

6. A device as set forth in claim 1 wherein said stop means is comprised of a stop member adapted to be engaged by said first stop boss and having a threaded bore therein, a screw member rotatably mounted in said bore in threaded engagement with said bore whereby upon rotation of said screw member said stop member will be moved to adjust the point of contact with said first stop boss.

7. A device as set forth in claim 6 further comprising a knob on said screw member protruding outwardly of said housing to facilitate rotation of said screw member.

8. A device as set forth in claim 1 wherein said stop means is comprised of a stop member slidably mounted in said housing and having corrugations on one surface thereof, complementary corrugations formed on said housing engageable with the corrugations formed on said stop member to hold said stop member in an adjusted position and releasable means engaging said stop member and connected to said housing to press the corrugations on said stop member into non-moveable engagement with the corrugations on said housing.

9. A device as set forth in claim 8 further comprising knob means on said stop member protruding outwardly of said housing to facilitate movement of said stop member.

* * * * *